United States Patent [19]

Oouchi et al.

[11] 4,409,452
[45] Oct. 11, 1983

[54] HIGH-FREQUENCY HEATING APPLIANCE

[75] Inventors: Keiji Oouchi; Isao Takoh; Hisayuki Serizawa, all of Kashiwa, Japan

[73] Assignee: Hitachi Heating Appliances Co., Ltd., Chiba, Japan

[21] Appl. No.: 273,812

[22] Filed: Jun. 15, 1981

[30] Foreign Application Priority Data

Jun. 19, 1980 [JP] Japan ................................ 55-83215

[51] Int. Cl.$^3$ .............................................. H05B 6/78
[52] U.S. Cl. ...................... 219/10.55 E; 219/10.55 F; 219/392; 99/421 H; 99/DIG. 14; 126/41 B; 126/338
[58] Field of Search .................. 219/10.55 E, 10.55 F, 219/10.55 R, 10.55 D, 10.55 A, 389, 392; 99/421 H, 421 HH, 421 HV, 419, 451, DIG. 14; 126/338, 41 B, 181

[56] References Cited

U.S. PATENT DOCUMENTS 3,298,247  1/1967  Juno ................................. 99/421 H
3,410,116 11/1968  Levinson ...................... 219/10.55 R
3,462,575  8/1969  Holaday ....................... 219/10.55 R
3,701,872 10/1972  Levinson ...................... 219/10.55 R
4,210,794  7/1980  Oguri ............................ 219/10.55 F
4,286,133  8/1981  Einset et al. ................. 219/10.55 F
4,334,136  6/1982  Mahan et al. ................ 219/10.55 R Primary Examiner—M. H. Paschall
Assistant Examiner—Philip H. Leung
Attorney, Agent, or Firm—Sughrue, Mion, Zinn, Macpeak & Seas

[57] ABSTRACT

A cooking appliance including both a resistive heating element and a high-frequency wave source such as a microwave generator in which a metal skewer is easily insertable through a front opening in a heating chamber and in which changes in dimensions in supporting members for the skewer are absorbed totally. A ceramic coupling member extends between a polygonally-shaped rotary shaft end and the metal skewer with a coupling hole in the coupling member being detachably insertable over the polygonally-shaped rotary shaft end. The skewer extends into a through-hole in the coupling member which has a shape similar to that of the skewer. A spring is provided to urge the coupling member outwardly into engagement with the rotary shaft end.

15 Claims, 5 Drawing Figures

HIGH-FREQUENCY HEATING APPLIANCE

BACKGROUND OF THE INVENTION

The present invention relates to a high-frequency heating appliance which is provided with a heating element, such as a resistive heating element, in addition to a high-frequency heating device.

In order to eliminate unevenness in heating or scorching of foods being cooked and to provide uniform finishing to the food in a high-frequency heating appliance which is also provided with a resistive heating element, there has conventionally been used a method of rotating a receiver on which the food product being cooked is placed or a method of circulating hot air in the heating chamber by means of a blower. However, these techniques have not proved entirely satisfactory because the outer surface of the food product does not have the desired scorched finish where the food is in contact with the receiver or where juice has dropped on the receiver upon cooking roast chicken or the like as a result of which the upper portion of the food tends to be too dry. Hence it is required for example, that the heating chamber often be opened during cooking, the food product be turned over, or the juice be poured over the food product. Thus, the conventionally employed methods are deemed inadequate.

Taking this into account, it has been proposed to use a rotatably mounted skewer which extends horizontally through the central part of the heating chamber. Food products such as chicken or the like positioned on the skewer are rotated manually or by a driving device such as an electric motor or the like to thereby cause uniform scorching of the surface of the product. In addition, juice is made flow in a recirculating manner onto the surface of the food product being cooked so as to always maintain the surface moist and to obtain an excellent glossy finish. However, the metal skewer scatters the high-frequency waves from the heating chamber and hences tends to cause undesirable electromagnetic wave leakage. Moreover, it is necessary to be able to mount and detach the metal skewer, which is longer than the dimensions of the opening of the heating chamber. Thus, it becomes necessary to provide a slot in the side wall of the heating chamber extending from the front edge to the central part thereof as shown in FIG. 1, or to construct the heating chamber in two split halves, as shown in FIG. 2, which are hinged together to be opened and closed. To provide such slot or split construction is not at all desirable from the standpoint of leakage of electromagnetic waves. In order to eliminate such problems, it has been proposed to project the end of the metal rotation shaft of the skewer from the outside of the heating chamber into the heating chamber, taking into consideration the heat-resistant temperature thereof, to fix a metal receiver to the side wall of the heating chamber so as to support the rotation shaft, again taking into consideration the heat-resistant temperature, to provide a metal skewer which is shorter than the dimensions of the opening of the heating chamber at the front opening, and to rotate the skewer from one end thereof. However, in this case, a metal bushing must be provided which must be maintained in electrical contact with the metal skewer shaft. As a practical matter, this is not possible due to accumulation of oils, adherence of food particles, or thermal deformation. As the result, sparks are generated, which can cause problems such as flaming. In particular, in the case where the bushing is horizontally positioned, since it is difficult to shorten the radial gap (in comparison with the case where the bushing is vertically positioned), there is a high risk of spark generation. Thus, none of the prior art skewer constructions have proved very satisfactory in practice.

In addition, since it is common to construct the heating chamber with very thin steel plates especially in a household high-frequency heating appliance, the side walls of the heating chamber easily yield to pressure due to thermal expansion when the temperature becomes high or due to application of a load. In this case, the metal bushing, which is fixed thereto, undergoes a swinging motion. As a result, the generation of sparks as mentioned above is induced, or the end of the metal rotation shaft and the end of the metal skewer can become detached from each other. Therefore, sparks can be generated at both ends of the shaft. In addition, as far as the connection between both the ends as mentioned above is concerned, there has not been any suitable technique available for performing the mounting and dismounting operation from the front opening, for preventing the occurrence of dropping accidentally at the rotation time, and for absorbing the variations of the inner dimensions of the heating chamber due to thermal deformation.

Furthermore, there is another problem due to the provision of the metal casing which surrounds the heating chamber. Namely, an inner space within the casing must be utilized to house various electric and mechanical parts. However, since the temperature becomes considerably high, especially when the resistive heating element is being used, a high temperature atmosphere is produced not only in the heating chamber but also in the inner space in which the electric and mechanical parts are housed. An electric motor provided to rotate the metal skewer as mentioned above must be protected from such a high temperature atmosphere. Thus, it is necessary to decrease the heat radiated from the wall surfaces of the heating chamber and heat which is transferred through the rotation shaft as much as possible. It is also required to speedily radiate heat generated by the electric motor itself.

With regard to the mounting of the metal skewer to the end of the rotation shaft, the opening of the heating chamber is not very wide. To enable the connection thereto without the need of complex maneuvering, it is required that the connecting parts be simple and that certain and easy insertng connection be ensured. Moreover, it is required that the food after it has been cooked can be easily removed without burning the hands of the cook, specifically, without the cook having to grasp the cooked food product directly in his or her hand. Also, it is required that the food product not fall off the skewer during a cooking operation. None of the prior art constructions have been capable of fully meeting these requirements.

SUMMARY OF THE INVENTION

Accordingly, a primary object of the present invention is to provide a high-frequency heating appliance which is provided with a resistive heating element wherein a metal skewer is provided horizontally, detachably and rotatably mounted at the central part of a heating chamber, and the metal skewer is heated while being rotated at a constant rotation rate by means of an electric motor, thereby providing excellent cooking without causing unevenness in heating and providing a desired amount of surface scorching and surface glossiness.

Another object of the present invention is to provide a high-frequency heating appliance which is also provided with a resistive heating element wherein a metal skewer which is provided in the heating chamber thereof is rotated at a constant rotation rate by means of an electric motor from the outside of the heating chamber, and in which leakage of high frequency waves is completely prevented and in which heat damage to the motor is also prevented.

Still another object of the present invention is to provide a connecting, mounting and dismounting, and adjusting structure which is suitable for a high-frequency heating appliance which is also provided with a resistive heating element wherein a metal skewer is easily inserted through and connected from the front opening of the heating chamber, the metal skewer is easily detached without directly holding the metal parts and moreover, the metal skewer cannot be made to fall out of its mountings during rotation due to thermal deformation of the heating chamber and due to vibration thereof.

In accordance with these and other objects of the invention, there is provided a cooking appliance including both a resistive heating element and a high-frequency wave source including a heating chamber and a metal skewer adapted to be positioned within and longitudinally of the heating chamber. The skewer has a length which is shorter than a horizontal distance between opposed side walls of the heating chamber. A driving rotation shaft rotatingly drives the skewer from a first end thereof with the driving rotation shaft passing through one of said side walls of the heating chamber. The driving rotation shaft is formed of a low high-frequency loss dielectric material. An electric motor is mounted outside the heating chamber. A receiver made of a low high-frequency loss dielectric material supports a second end of the skewer. The second end of the skewer is preferably tapered. A coupling is detachably connected to the driving rotation shaft and the first end of the skewer in the heating chamber for transmitting rotational movement of the driving rotation shaft to the skewer. A clamping member is provided on the skewer which is slidably longitudinal direction thereof for holding food products on the skewer. A power transmission structure connects a driven portion of the driving rotation shaft and the electric motor without any slip therebetween.

DESCRIPTION OF THE PREFERRED EMBODIMENTS

Figure 1:
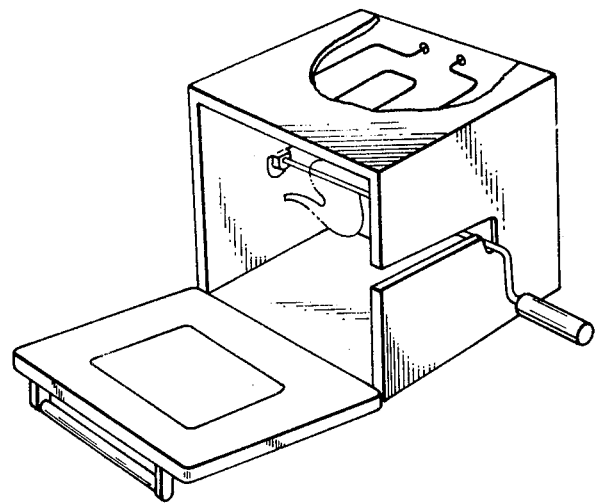
FIG. 1 and FIG. 2 are perspective views of a conventional oven suitable for cooking food on a skewer of a type which does not use high-frequency waves.
Figure 2:
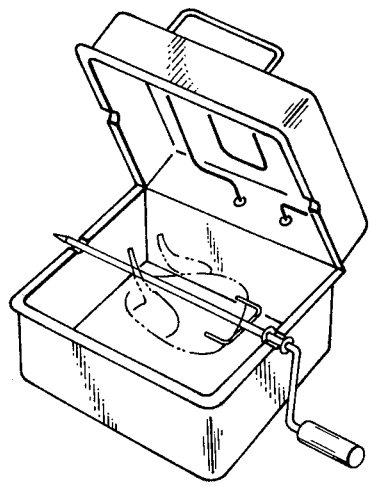
Figure 3:
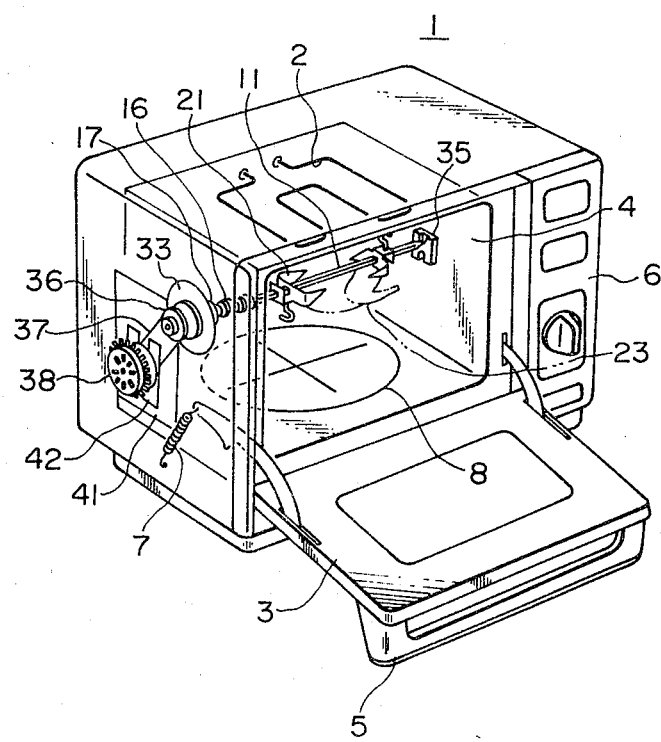
FIG. 3 is a perspective view showing essential parts of a high-frequency heating appliance to which the present invention is applied.

As shown first in FIG. 3, a high-frequency heating appliance 1 which incorporates both a resistive heating element 2 and a high-frequency heating device such as a magnetron or the like, and reference numeral 3 denotes a front cover which is designed to prevent leakage of high-frequency waves. The front opening of the heating chamber 4 is opened and closed by the front cover 3. Reference numeral 5 denotes a cover handle which is used to open and close the front cover 3. Reference numeral 6 denotes a control panel where control elements of various types such as switches, timers and the like or indicators such as a temperature scale or time scale or the like are mounted. Reference numeral 7 denotes a spring provided to ease the opening and closing of the front cover 3 and to hold the front cover 3 in close contact with the front opening of the heating chamber 4 when the cover is closed. Reference numeral 8 denotes a receiver, which may be rotated if desired.

Figure 4:
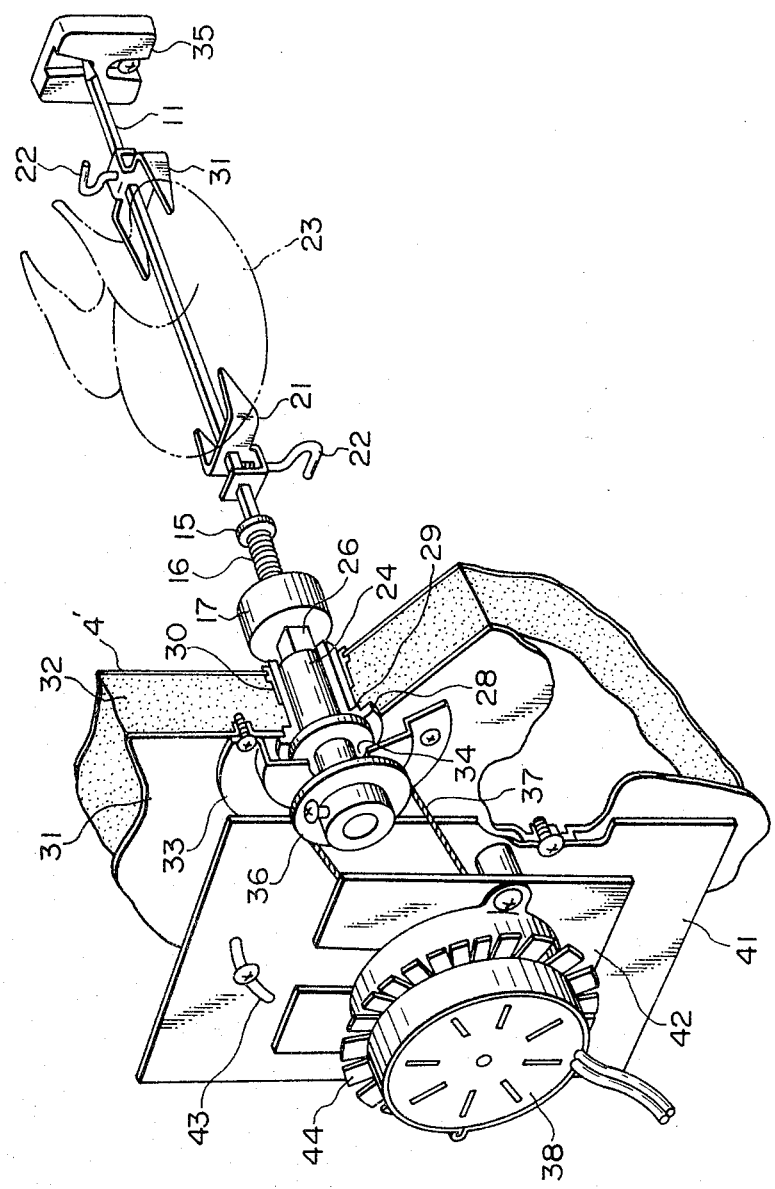
FIG. 4 is an enlarged and partially broken-away perspective view showing only the above-mentioned essential parts.
Figure 5:
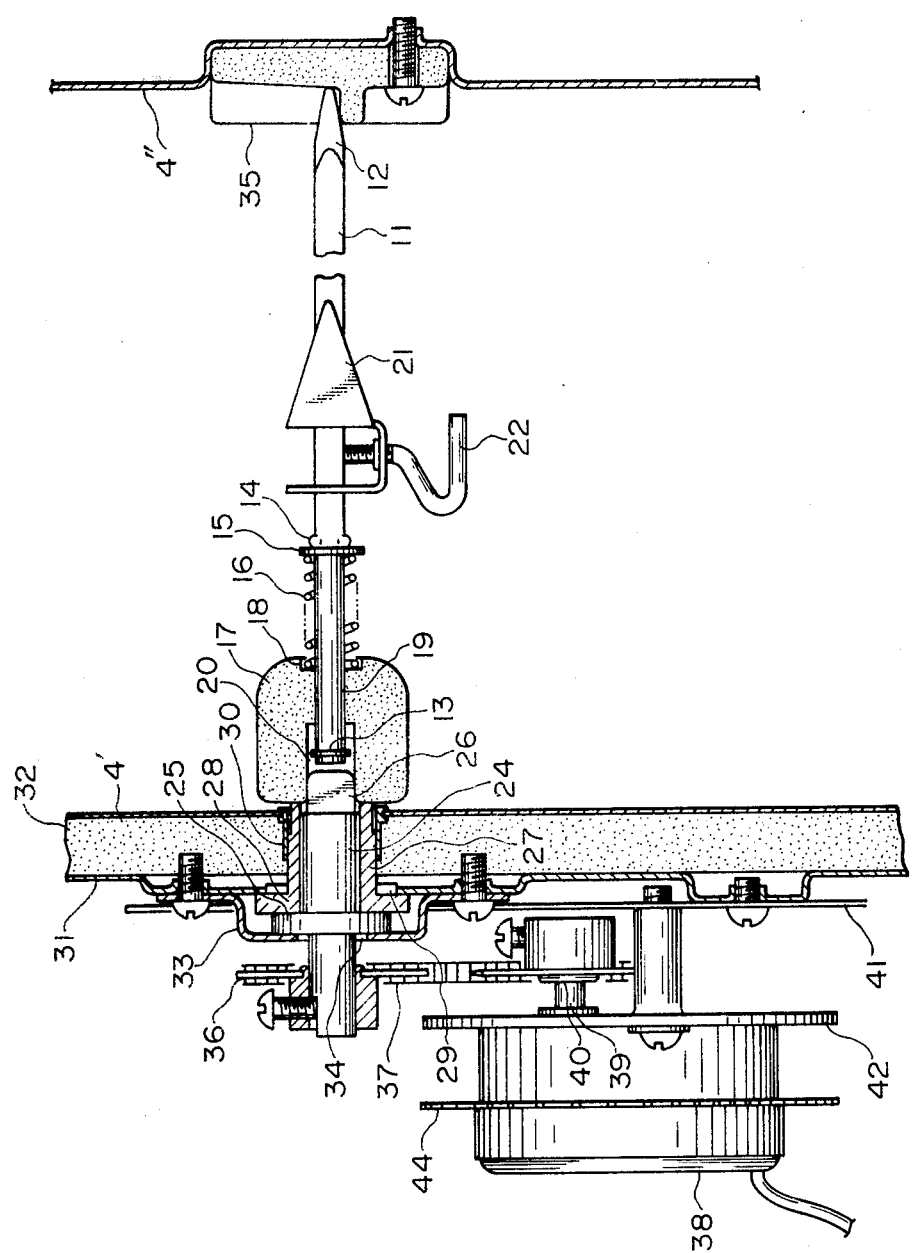
FIG. 5 is a front view partially shown in cross-section of the above-mentioned essential parts as seen from the front side.

With reference now to FIGS. 4 and 5, reference numeral 11 denotes a metal skewer made of a metal such as stainless steel which does not easily rust or corrode. The overall length of the metal skewer 11 is shorter than the inner dimension between the side walls 4' and 4" of the heating chamber. The configuration of the skewer 11 in cross section is a polygon such as square or the like. One end of the metal skewer 11 has a conical shape with a semi-spherical tip. The other end of the metal skewer 11 is provided with a groove adapted to receive an E-shaped stop ring 13 (FIG. 5). Projection 14 are formed on the skewer 11 at a position between the end with the groove and the center of the skewer 11 extending slightly above the ridgelines of the skewer 11. The projections 14 form a stop for a washer 15 which is fitted onto the skewer 11 from the other end thereof. The washer 15 also acts as a stop for an elastic member 16 such as a coiled spring made of, for example, stainless steel wire, which is likewise fitted onto the skewer 11 from the other end thereof. The other end of the elastic member 16 is limited by the step 18 formed on a coupling 17.

The coupling 17 is made of a dielectric material such as porcelain which has a superior heat-resistance and low high-frequency loss. The configuration and dimension of the hole 19 into which the metal skewer 11 is inserted coincide with those of the metal skewer 11. The coupling 17 is slidable in the longitudinal direction but can move only a little (by an amount which corresponds to the small gap) in the rotational (radial) direction.

A hole 20 for connection to the coupling 17 is formed from the other end (the end opposite the end with the step 18) of the coupling 17. The configuration and dimensions of the hole 20 coincide with those of a rotary shaft end 26, as is mentioned afterwards. The fit between the rotary shaft end 26 and the hole 20 for connection is made somewhat loose in comparison with the fit between the metal skewer 11 and the through-hole 19. The ends of the hole 20 and the rotary shaft end 26 are rounded so as to make it easy to insert the shaft into the hole or pull out the shaft from the hole. The through-hole 19 and the hole 20 for connection are arranged coaxially with each other and the configurations thereof are made similar to each other. For example, if the skewer 11 has a square cross-section, the rotary shaft end 26 also has a square cross-section. After the washer 15 and then the elastic member 16 are fitted onto the skewer 17, the coupling 17 is fitted thereon. Thereafter, the E-shaped stop ring 13 is positioned on the skewer 11 so as to prevent removal of the coupling 11.

A stationary member 21 holds a food product 23 such as chicken or the like at a desired position by means of a stationary screw 22. A rotary shaft 24 is made of a dielectric material such as polyimide resin which is heat resistant and which has a low high-frequency loss.

A disc-like portion 25 is provided at the central part of the rotary shaft 24. The cross-sectional configuration of the rotary shaft end 26 is a polygon, for example, a square. A bushing 27 which rotatably supports the rotary shaft 24 is made of a dielectric material such as ethylene tetrafluoride resin which has a low high-frequency loss, which is heat-resistant and which can slide easily. The bushing 27 is provided with a flange portion 28 and a projection 29 for preventing rotation of the bushing 27. The bushing 27 is guided by a sleeve 30 which is made of a thin metal member having an inner diameter of about 15 mm and which is horizontally mounted, substantially at the center one of the side walls 4' of the heating chamber. The end of the bushing 27 horizontally projects into the heating member.

A shield plate 31 is made of steel plate which is somewhat thicker than the side wall 4' of the heating chamber. The shield plate 31 is mounted on a bottom plate parallel to the side wall 4' of the heating chamber. In the space between the shield plate 31 and the side wall 4' of the heating chamber is filled an insulating material such as fiberglass which has a superior heat resistance. The bushing 27 passes through a somewhat larger hole which is formed in the shield plate 31 and is guided by the sleeve 30 so as to project into the heating chamber 4. Then, the rotary shaft 24 is inserted in the bushing 27 so that the rotary shaft end 26 projects horizontally from the end of the bushing 27 into the heating chamber 4. A bracket 33 is formed in a cup shape from a steel plate. Between the shield plate 31 and the bracket 33 is clasped and held the flange portion 28 of the bushing 27 and the collar 25 of the rotary shaft 24.

A gap is provided so that the various members do not bind together upon thermal expansion so that rotation is always possible. Specifically, a gap 34 is provided in the radial direction between the rotary shaft 24 and the edge of the central hole in the bracket 33. The width of gap 34 corresponds to that of the radial gap between the edge of the central hole in the shield plate 31 and the bushing 27. By so doing, errors can be absorbed even if the sleeve 30 is moved due to thermal expansion or the application of a load or if the center of the hole in the shield plate 31 deviates from the center of the sleeve 30 due to mechanical tolerances or assembly errors. In addition, even if the side walls 4' and 4" expand and contract with respect to each other in the axial direction of the skewer 11 due to heating and cooling thereof, the side wall 4' of the heating chamber can be displaced without being bound by the shield plate 31 or the rotary shaft 24 because of the radial gap between the inner surface of the sleeve 30 and the outer surface of the busing 27.

Since the conical tapered end 12 of the skewer 11 is fitted in the V-shaped groove in the receiver 35 which is made of a dielectric material and which is fixed at a position opposite to the sleeve 30 substantially at the center of the side wall 4" of the heating chamber, movement of the side wall 4" of the heating chamber will be absorbed by the expansion and contraction of the elastic member 16.

A driven sprocket wheel 36 transmits rotary power from a driving wheel 40 which is mounted on the output shaft 39 of and electric motor 38 to the rotary shaft 24 via a chain 37. A flat adjustment plate 41 insulatingly supports the electric motor 38 through a spacer 42 which is made of a material such as a phenol resin which has a low heat conductivity and superior heat resistance. The adjustment plate 41 is fixed to the shield plate 31 by means of a screw which extends through an arcuate hole 43. The tension of the chain 37 can be adjusted by adjusting the position of the screw in the hole 43.

Reference numeral 44 denotes radiating fins which are formed by punching a plate material such as copper or aluminum having a good heat conductivity along the longitudinal direction thereof so as to obtain a comblike shape. The teeth of the "comb" are bent at their bases and the flat plate portion thereof is coupled to the electric motor 38 is that the structure functions as a heat radiator.

The following advantageous features are provided with a heating appliance of the invention constructed as described above.

Since the tapered end 12 of the metal skewer 11 is conical and pointed, it is possible to easily pierce food products with it. The front cover 3 can easily be opened and the food product 23 on the metal skewer 11 attached so as not to idly rotate by means of fixing screws 22 of metal fittings 21. The tapered end 12 is fitted into the V-shaped groove of the the receiver 35 simply by dropping it thereinto from above. Since the conical surface of the tapered end then comes into contact with the step of the receiver 35, smooth rotation is ensured because the tapered end 12 to be supported for rotation has a circular cross section, even if the configuration of the cross-section of the skewer 11 is a polygon which is convenient for preventing idle rotation of the food product 23. The coupling 17 is slidable in the axial direction of the skewer 11 by the elastic member 16 which can be expanded and contracted. When the coupling 17 is inserted, the elastic member 16 is slid manually in a direction so as to compress the elastic member 16 and with the hole 20 being fitted onto the rotary shaft end 26 so as to achieve connection therebetween. In this case, since the configurations of the cross sections of the metal skewer 11 and the rotary shaft end 26 are similar to each other and moreover the through-hole 19 and the hole 20 are arranged coaxially, it is possible to easily fit hole 20, which is not visible during this stage of the installation procedure, onto the rotary shaft end 26 only if one surface of the rotary shaft end 26 is matched thereto. In addition, since the corners at the entrance of the hole 20 as well as the rotary shaft end 26 are rounded, the inserting operation further becomes easy.

Upon releasing the operator's hold of the coupling 17 after having inserting the coupling 17 only the rotary shaft end 26, the coupling 17 will slide in the axial direction until it comes into contact with the end of the bushing 27 which projects into the heating chamber 4 due to the expanding force of the elastic member 16.

Thus, the inserting operation is completed. At this time, the metal skewer 11 is pushed towards the receiver 35 by the repulsive force of the elastic member 16, and the spherical tip surface of the conical tapered end is pushed against the wall surface of the V-shaped groove of the receiver 35 which is somewhat sloped.

Therefore, it is possible to easily and reliably mount the skewer 11, which is shorter than the inner dimension between the side walls of the heating chamber 4, in the heating chamber 4 without requiring modification and adjustment. Even if the side walls 4' and 4" of the heating chamber are deformed or displaced due to thermal expansion when in use, there is no danger that the fitted members will come apart because the elastic member 16 always pushes outwardly from both ends of the skewer 11. When it is desired to disassemble these parts, a plate-like tool is inserted into the gap between the side wall 4' of the heating chamber where the end of the bushing 27 which projects into the heating chamber 4 and the adjacent end of the coupling 17. Then, the plate-like tool is moved in the direction to compress the elastic member 16 in a prying motion, thereby disconnecting the coupling 17 from the rotary shaft end 26 which is fitted into the hole 20. Thus, these parts can easily be disconnected. As it is easy to fit the rotary shaft end 26 into the hole 20 due to the fact that the corners at the entrance of the hole 20 as well as the rotary shaft end 26 are rounded, it is also quite easy to disconnect the rotary shaft end 26 and the hole 20. In case the coupling 17 is made of porcelain, oils and fats which adhere to the surface of the coupling 17 during cooking can easily be cleaned off. However, if the glaze is formed on the inner surface of the hole 20 or in the through-hole 19, the dimensions thereof may vary widely. As a consequence, it may become impossible to provide an appropriate gap between the through-hole 19 and the skewer 11 or between the hole 20 and the rotary shaft end 26, thereby making it impossible to insert the skewer 11 on the rotary shaft end 26.

In accordance with the present invention, however, the above-mentioned potential problems are eliminated by providing the step 18, which functions also as the seat for the elastic member 16, at the end of the through-hole 19 so as to prevent the inflow of molten glaze into the through-hole 19 due to surface tension during coating of the glaze. The side surface at the end of the hole 20 without glaze is prevented from coming into contact with the side wall 4' of the heating chamber and thereby causing damage thereto or leading to the production of abnormal sound by the end of the lubricative bushing 27 which projects into the heating chamber 4.

The shield plate 31, which has a mechanical strength superior to that of the side wall 4' of the heating chamber, is independently mounted. Therefore, it is possible for the shield plate 31 to hold the bushing 27 and the rotary shaft 24 without them being affected by initial deformation of the side wall 4' of the heating chamber, displacement due to thermal deformation, or the application of a load. Likewise, deformation or movement of the side wall 4' of the heating chamber does not at all affect the relative positional relationships thereof with respect to the electric motor 38 which is mounted on the shield plate 31. In addition, since the bushing structure is mounted without using the side wall 4' of the heating chamber which is made of a thin steel plate, the efficiency of assembly of the appliance is outstandingly enhanced and error is absorbed due to the provision of the radial gap with respect to nonalignment between the sleeve 30 and the rotary shaft 24. At the same time, it contributes to the lowering of cost by so doing. Furthermore, the driven members around the rotary shaft 24 and the driving members such as the electric motor 38 and the like are mounted on the same shield plate 31 which is very rigid. In addition, a chain 37 is employed as the means for transmitting rotational power. With this construction, even if the driven members are positioned so as to match the sleeve 30, it is possible to easily adjust the positions of the driving members. In addition, rotational power is precisely transmitted from the electric motor 38 to the food product 23 without the rotation being affected by changes of the load.

With the described construction, leakage of high-frequency electromagnetic waves does not occur around the metal skewer 11 and the rotation shaft 24 because the rotary shaft 24 and the bushing 27 are made of dielectric material. The hole in the sleeve 30 is the only opening where there is any possibility of high-frequency wave leakage. However, if the sleeve 30 has an inner diameter of about 15 mm and a length of about 10 mm, a sufficient shielding effect will be provided.

Moreover, inasmuch as both ends of the skewer 11 are rotatably supported by the receiver 35, and the coupling 17 and the rotary shaft end 26 which are made of dielectric materials and are isolated from the side walls 4' and 4" of the heating chamber, no spark will be generated.

Still further, almost all of the radiant heat and the conduction heat from the side wall 4' of the heating chamber is shielded by the insulating material 32 and the shield plate 31. In addition, heat conducted from the rotary shaft 24 is outstandingly reduced by the use of the resin. Furthermore, the adjustment plate 41 is arranged in such a manner as to shield the the electric motor 38 and the heating chamber 4, and the electric motor 38 is positioned above this adjustment plate 41 with a spacer 42. Moreover, the surface of the spacer 42 which is in contact with the electric motor 38 is arranged in such a manner as to act as a shield with respect to the heating chamber 4. Thus, the heat shielding effect is enhanced. In addition, the electric motor 38 is arranged at a position rearward and below an area where the temperature of the atmosphere is relatively low. Furthermore, rotational power of the motor is transmitted by means of a chain 37, which arrangement has a low thermal conductivity. In addition, the radiating fins 44 are provided around the electric motor 38. Thus, the heat generated from the electric motor itself also can readily escape.

In accordance with the present invention as explained in detail hereinabove, a high-frequency heating appliance which includes a resistive heating element and which has provisions for cooking food on a skewer and which can meet all the objects of the present invention as mentioned above is provided.

What is claimed is:

1. A cooking appliance including a resistive heating element and a high-frequency wave source, comprising:
   a heating chamber;
   a metal skewer having a length shorter than a horizontal distance between opposed side walls of said heating chamber;
   a driving rotation shaft for rotatingly driving said skewer from a first end of said skewer, said driving rotation shaft passing through one of said side walls of said heating chamber, said driving rotation shaft being formed of a dielectric material;
   an electric motor for rotating said driving rotation shaft mounted outside said heating chamber;
   a receiver made of dielectric material rotatingly and detachably supporting a second end of said skewer;
   a coupling detachably connected to said driving rotation shaft and slidably mounted on said first end of said skewer for transmitting rotational movement of said driving rotation shaft to said skewer, said coupling being formed of a dielectric material;

a spring positioned around said skewer and disposed between a stop integrally formed with said skewer and said coupling for urging said first end of said skewer away from and out of contact with said driving rotation shaft and urging said coupling toward said driving rotation shaft;

a clamping member provided on said skewer and slidable in the longitudinal axial direction of said skewer for holding food products on said skewer; and power transmission means for connecting a driven portion of said driving rotation shaft and said electric motor without slip therebetween.

2. The cooking appliance as claimed in claim 1 wherein a cross-sectional configuration of said driving rotation shaft at an end thereof in said heating chamber is a polygon similar in configuration to a cross-sectional configuration of a connection hole of said coupling.

3. The cooking appliance as claimed in claim 1 wherein a cross-sectional configuration of said driving rotation shaft at an end thereof in said heating chamber, a configuration of a connection hole of said coupling and a cross-sectional configuration of a sliding part of said coupling are polygons which are similar to one another.

4. The cooking appliance as claimed in claim 1 wherein said second end of said skewer supported by said receiver is generally conically shaped.

5. The cooking appliance as claimed in claim 1 wherein said coupling is made of porcelain.

6. The cooking appliance as claimed in claim 5 wherein a step portion is provided at an inlet portion of said connection hole of said coupling so as to prevent the inflow of glaze into said hole and to provide a seat for connection for an elastic member, one end of said spring being received on said step portion.

7. The cooking appliance as claimed in claim 1 wherein said power transmission means comprises a toothed belt.

8. The cooking appliance as claimed in claim 1 wherein said power transmission means comprises a chain.

9. A cooking appliance for cooking heated food including a resistive heating element and high-frequency wave source, comprising, a heating chamber; a metal skewer having a length shorter than a horizontal distance between opposed side walls of said heating chamber; a shield plate disposed outside of and substantially parallel to a first of said side walls of said heating chamber, said shield plate having a thickness greater than that of said side walls; an insulating material filled between said shield plate and said first side wall; a sleeve coupled to said first side wall and extending towards said shield plate; a bushing having a first end fitted through said sleeve and extending into said heating chamber and having a second end with a flange formed thereat abutting an outside surface of said shield plate; a rotary shaft extending through said bushing, said rotary shaft having a central cylindrical portion in said bushing, a flange portion extending outside of and abutting said flange of said bushing, an outer end portion extending beyond said flange portion of said rotary shaft, and a rotary shaft end portion extending into said heating chamber, said rotary shaft end portion having a polygonal cross-section; a cup-shaped bracket joined to said shield plate with screws, said cup-shaped bracket having a hole formed therein through which passes said outer end portion of said rotary shaft, a radial gap being provided between said outer end portion of said rotary shaft and said cup-shaped bracket; a coupling made of a dielectric material, said coupling having a through-hole formed therein for receiving a first end of said skewer, said through-hole having a cross-sectional configuration which is polygonal of the same configuration as a cross-sectional configuration of said skewer where said skewer passes through said through-hole, and said coupling having a coupling hole formed therein having a cross-sectional configuration similar to a polygonal cross-sectional configuration of said rotary end shaft for receiving said rotary end shaft therein; at least one projection formed on said skewer; a washer slidably disposed on said skewer abutting said at least one projection; elastic means disposed between an end of said coupling opposite said coupling hole and said washer for exerting an outward pressure on said coupling; attachment means disposed on said skewer for attaching a food product to said skewer; a receiver mounted on a second side wall of said heating chamber opposite said first side wall, said receiver having V-shaped grooves formed therein for receiving a second end of said skewer, said second end of said skewer being tapered, said receiver being made of a dielectric material; an adjustment plate having one end pivotally joined to said shield plate and having a second end with an arc-shaped slot formed therein and a screw positioned in said slot for fixing the position of said adjustment plate relative to said shield plate; a spacer for mounting said electric motor on said adjustment plate; a drive wheel coupled to an output shaft of said electric motor; a driven sprocket coupled to said outer end portion of said rotary shaft; and a chain operatively disposed around said driven sprocket and said drive wheel.

10. The cooking appliance as claimed in claim 9 wherein said coupling and said rotary shaft end have rounded edges.

11. The cooking appliance as claimed in claim 9 wherein said rotary shaft is made of a polyimide resin.

12. The cooking appliance as claimed in claim 9 wherein said coupling has recesses formed therein for receiving an end portion of said elastic member.

13. The cooking appliance as claimed in claim 12 wherein said elastic member comprises a coil spring made of stainless steel.

14. The cooking appliance as claimed in claim 9 wherein said bushing is provided with at least one projection engaged with said shield plate for preventing rotation of said bushing.

15. The cooking appliance as claimed in claim 9 further comprising an E-shaped stop ring provided on said skewer within said coupling hole in said coupling.

* * * * *